US006820010B1

(12) United States Patent
Sahai et al.

(10) Patent No.: US 6,820,010 B1
(45) Date of Patent: Nov. 16, 2004

(54) METHOD FOR DETERMINING SHEAR-WAVE VELOCITY MODEL FOR DEPTH MIGRATION OF MODE-CONVERTED DATA

(75) Inventors: Surinder K. Sahai, Ponca City, OK (US); Robert A. Meek, Ponca City, OK (US)

(73) Assignee: ConocoPhillips Company, Houston, TX (US)

(*) Notice: Subject to any disclaimer, the term of this patent is extended or adjusted under 35 U.S.C. 154(b) by 0 days.

(21) Appl. No.: 10/426,554

(22) Filed: Apr. 30, 2003

(51) Int. Cl.[7] ............................................... G01V 1/28
(52) U.S. Cl. ........................................................ 702/18
(58) Field of Search ............................. 702/14, 17, 18; 367/73, 74

(56) References Cited

U.S. PATENT DOCUMENTS

| | | | |
|---|---|---|---|
| 4,839,869 A | 6/1989 | Corcoran | 367/53 |
| 6,128,580 A | 10/2000 | Thomsen | 702/18 |
| 6,212,477 B1 | 4/2001 | Zhu et al. | 702/14 |
| 2003/0021184 A1 | 1/2003 | Zhang | 367/14 |

OTHER PUBLICATIONS

Richard Bale et al.; *Prestack Depth Migration of Converted Wave Data in Anisotropic Media*, 1998 SEG Expanded Abstracts, 3 Figs.

Ian F. Jones et al.; *3–Prestack Depth Migration and Velocity Model Building*, The Leading Edge, Jul. 1998, pp. 897–906, 11 Figs.

Dan Kosloff et al.; *Velocity and Interface Depth Determination by Tomography of Depth Migrated Gathers*, Geophysics, vol. 61, No. 5 (Sep.–Oct. 1996), pp. 1511–1523, 18 Figs.

Robert A. Meek et al., *3D Interval Velocity/Depth Model Building in the Southern Gas Basin UK, 3D Versus 2D Model Building*, 1998 SEG Expanded Abstracts, 9 Figs.

Oleg Mikhailov et al.; *Converted Wave Imaging: Theory for Residual Velocity Analysis and Examples of Pre–Stack Depth Migration of Alba 4C Data*.

Phil Schultz et al.; *Seismic Velocity Model Building: CE in Dallas 2 November*, The Leading Edge, Jul., 1997, 3 Figs.

Elena Shoshitaishvili et al.; *Pre–stack Depth Migration Workflow for Converted Waves*.

Claudio D'Agosto et al.; *Tomographic Estimation of Compressional and Shear Wave Velocities from P–S Converted Waves*, ST 15.7, pp. 1885–1888, 6 Figs.

*Primary Examiner*—Donald McElheny, Jr.
(74) *Attorney, Agent, or Firm*—Madan, Mossman & Sriram, P.C.

(57) ABSTRACT

The present invention provides for a method of processing mode converted seismic data. The method comprises acquiring seismic data and determining a P-wave velocity model for the seismic data. An S-wave velocity model is determined from the P-wave velocity model. The mode converted seismic data are depth migrated forming CIP mode converted seismic data gathers. Corrected S-wave velocities are determined from near-offset data of the CIP gathers which corrects the depth migrated mode converted seismic data to the P-wave velocity model depth. A correction factor is provided and the iterating with the method quickly converges to a solution. This invention provides an efficient method of updating the shear wave velocity model for prestack depth migration of mode-converted data.

22 Claims, 7 Drawing Sheets

METHOD FOR DETERMINING SHEAR-WAVE VELOCITY MODEL FOR DEPTH MIGRATION OF MODE-CONVERTED DATA

FIELD OF THE INVENTION

This invention relates to the field of geophysical prospecting and, more particularly, to a method of imaging the subsurface of the earth in depth using compressional-wave, shear-wave and mode-converted wave data.

BACKGROUND OF INVENTION

Seismic data acquired in the field is always recorded in time due to the nature of the acquisition process. For seismic exploration using both compressional and mode-converted waves, it is a common practice to deploy a large number of multicomponent geophones on the surface of the earth and to record the vertical and horizontal vibrations of the earth at each geophone location to obtain a collection of seismic traces. When the vibrations are caused by a seismic source activated at a known time and location, the recorded data can be processed using methods well known in the art to produce an image of the subsurface. The image thus produced is commonly interpreted by geophysicists to detect the presence of hydrocarbons.

The geophones sensitive to vertical vibration modes record mostly compressional (P) waves while the geophones sensitive to horizontal modes record mostly shear (S) waves. The shear wave energy may be due to mode-conversion, i.e., when some compressional energy is converted to shear wave energy at a subsurface layer boundary or other impedance contrast. This type of wave is also referred to as a PS wave, signifying the conversion from P-wave to S-wave. Downgoing P-wave energy reflected as an upgoing P-wave and then recorded is referred to as a PP reflection.

Seismic data are interpreted to provide subsurface information of geological structure and conditions prior to drilling for minerals such as oil and gas. Seismic data are often displayed as "time sections" where the vertical scale is linear in arrival time, i.e., an ordinary seismic section. The seismic data interpreted on a time section is converted to depth before drilling for hydrocarbons commences. Depth conversion of time section data requires an accurate velocity model. Another approach is to depth migrate the seismic data before stacking in order to properly position the subsurface geological entities such as faults, channels, etc. The use of prestack depth migration has proliferated in recent years as the computing power has increased and the relative cost has decreased. Processing of mode-converted data is computationally expensive. Depth migration is more attractive than time migration because the common conversion point (CCP) varies with depth due to the asymmetric ray path of the downgoing compressional wave and the upgoing shear wave. The CCP is the common reflecting point where mode conversion from P- to S-waves or vice-versa occur for a dataset. Reciprocity (the conversion point being the same when source and receiver are interchanged) does not apply because of the asymmetric raypath, making lime migration processing more difficult. Thus the processing of mode-converted data in time is much more difficult and can be less accurate than the processing of compressional wave data. However, the depth migration of seismic data requires an accurate velocity model.

The velocity model for depth migration of compressional wave data can be obtained by one of several techniques discussed in the literature (e.g., Kosloff et al. (1996), Meek et al. (1998), Schultz and Canales (1997), and Jones et al. (1998). The migration of mode-converted data also requires knowledge of the shear wave velocity field. D'Agosto and Michelena (1997) developed a tomographic method to obtain P and S wave velocities from mode-converted data. Mikhailov and Frasier (2000), Bale et al. (1998), and Shoshitaishvili et al. (2000) have discussed the depth migration of mode-converted data. Their methods assume that the depth model and corresponding P-wave velocities are known from the analysis of the P-wave data. The methods describe using the residual moveout of mode-converted waves to update the velocity model and are fairly complex and computationally expensive.

There is a need for a method of updating the S-wave velocity model that is very simple and quickly leads to an acceptable solution for the final velocity model for depth migration of mode-converted data. The present invention satisfies this need.

SUMMARY OF THE INVENTION

The present invention provides for a method of processing mode converted seismic data. The method comprises acquiring seismic data and determining a P-wave velocity model for the seismic data. An S-wave velocity model is determined from the P-wave velocity model. The mode converted seismic data are depth migrated forming CIP mode converted seismic data gathers. Corrected S-wave velocities are determined from near-offset data of the CIP gathers which corrects the depth migrated mode converted seismic data to the P-wave velocity model depth. A correction factor is provided and the iterating with the method quickly converges to a solution.

It is an objective of this invention to provide an efficient method of updating the shear wave velocity model for prestack depth migration of mode-converted data. First, a seismic dataset (P-wave) is processed and prestack depth migrated using a number of different methods. A velocity model for P-waves is obtained which is used to calculate the travel-time tables for the downgoing P-waves. This model provides an initial velocity model for S-waves that is used to calculate the travel-time tables for the upgoing S-waves. The travel-time tables calculated from these steps are then used to depth migrate the mode-converted data. The common image point (CIP) depth gathers generated by depth migration are then examined to determine if the S-velocity of a horizon is too low or too high with respect to the S-velocity that flattens the seismic events on the CIP gathers. The depth of the near-offset on the CIP mode-converted image gather for a given horizon is compared to its depth on the velocity model for P-waves at the corresponding surface location. The discrepancy in depth is then used to update the S-wave velocity. The mode-converted data is depth migrated again with the updated S-wave velocity model and the CIP gathers are examined. Generally, this procedure leads to a satisfactory velocity model. However, another iteration of this process may be necessary sometimes to flatten the seismic event on the CIP gathers.

BRIEF DESCRIPTION OF THE DRAWINGS

The present invention and its advantages will be better understood by referring to the following detailed description and the attached drawings in which.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention is a method and apparatus for updating the shear wave velocity model for prestack depth migration of mode-converted data. The method and apparatus provides for an efficient and rapid solution for determining converted-wave and shear-wave velocity models for prestack depth migration processing. Other advantages of the invention will be readily apparent to persons skilled in the art based on the following detailed description. To the extent that the following detailed description is specific to a particular embodiment or a particular use of the invention, this is intended to be illustrative and is not to be construed as limiting the scope of the invention.

Figure 1:
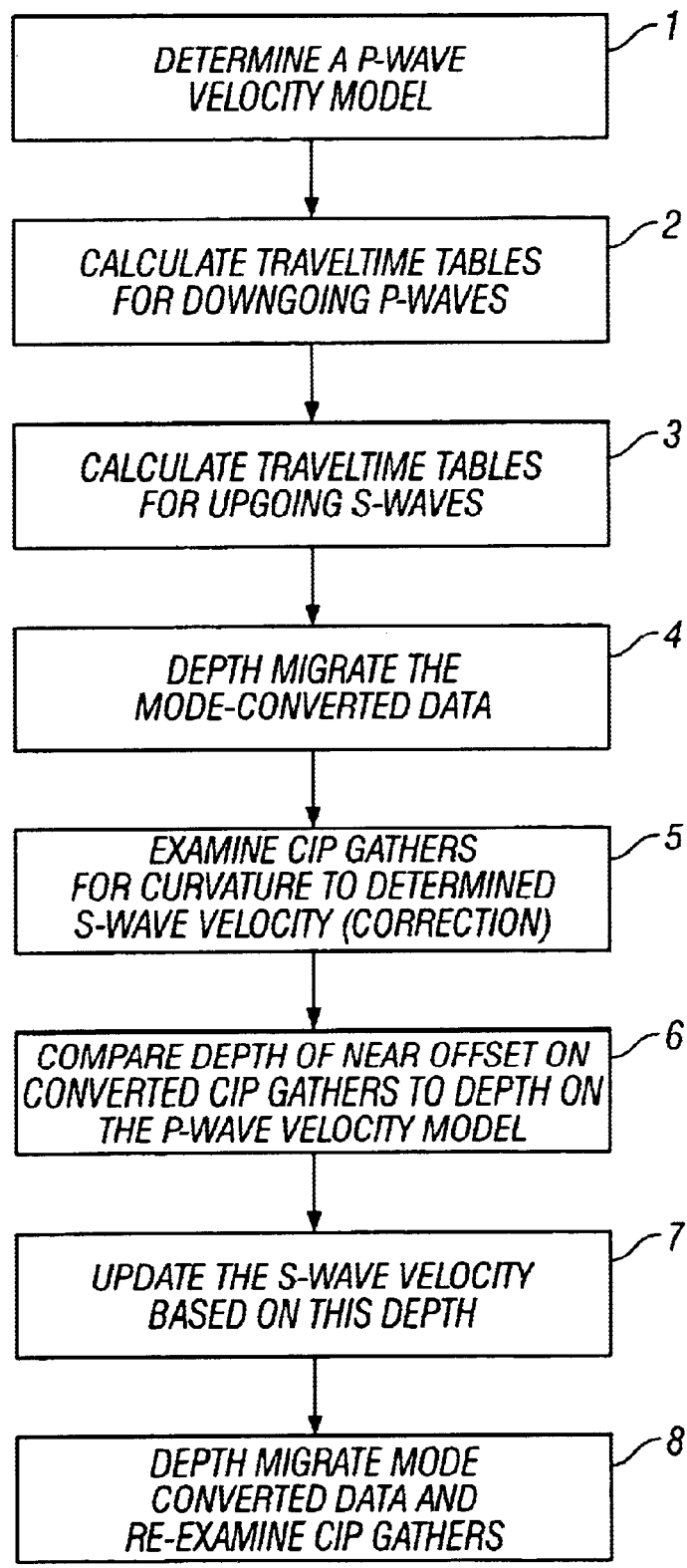
FIG. 1 is a flow chart illustrating the method of the present invention.

This invention provides an efficient method of updating the shear wave velocity model for prestack depth migration of mode-converted data. FIG. 1 is a flowchart illustrating the general method of the invention. First, a seismic dataset (P-wave) is processed and prestack depth migrated using any known method. A velocity model for P-waves is obtained 1 which is used to calculate the travel-time tables for the downgoing P-waves 2. This model provides an initial S-wave velocity model that is used to calculate the travel-time tables for the upgoing S-waves 3. The travel-time tables calculated from these steps are then used to depth migrate the mode-converted data 4. The common image point (CIP) depth gathers generated by depth migration are then examined 5 to determine if the S-velocity of a horizon is too low or too high with respect to the S-velocity that flattens the seismic events on the CIP gathers. The depth determined from the near-offset on the CIP mode-converted image gather for a given horizon is compared 6 to the same horizon depth on the velocity model for P-waves at the corresponding location. The discrepancy in depth is then used to update 7 the S-wave velocity. The mode-converted data is depth migrated 8 again with the updated S-wave velocity model and the CIP gathers are examined. Generally, this procedure leads quickly to a satisfactory velocity model. However, another iteration of this process may be necessary sometimes to flatten the seismic event on the CIP gathers.

In general, seismic energy may be generated at or near the surface of the earth by the use of a seismic source. The location of this source is known as a source position (labeled point $S_1$ in FIG. 3). The resulting acoustic wave travels downward in the earth in the form of a compressional or P-wave. The P-wave emanates from source $S_1$ and impinges on the surface of geologic layer boundary L at point A. An impedance contrast across this boundary L results in energy being partitioned into reflected and refracted wave modes. Part of the energy in the wave is reflected as another P-wave back to the surface (between point A and a seismic receiver at position $R_1$ in FIG. 3). Another part of the energy of the downgoing P-wave is converted to an S-wave and reflected back to the surface (from point A to a receiver at position $R_2$ in FIG. 3). And yet another pan of the energy in the P-wave is transmitted through the layer to reflect off further layers below (not shown). The reflected P-waves and S-waves are received at multi-component geophones or other types of detectors located along or near the surface of the earth or bottom of the ocean, and recorded in reproducible forms as z-component, x-component and y-component seismograms and their combinations. The seismograms measure the amount of time the wave traveled from the source position to the receiver position. In the case of an ocean bottom cable, a hydrophone also measures the pressure in the water in addition to the three components. These seismograms are collected along known and/or predefined spatial positions along the surface of the earth known as receiver positions. The z-component and hydrophone primarily measure the P-wave energy. The x-component and y-component seismograms measure the S-wave energy.

Figure 3:
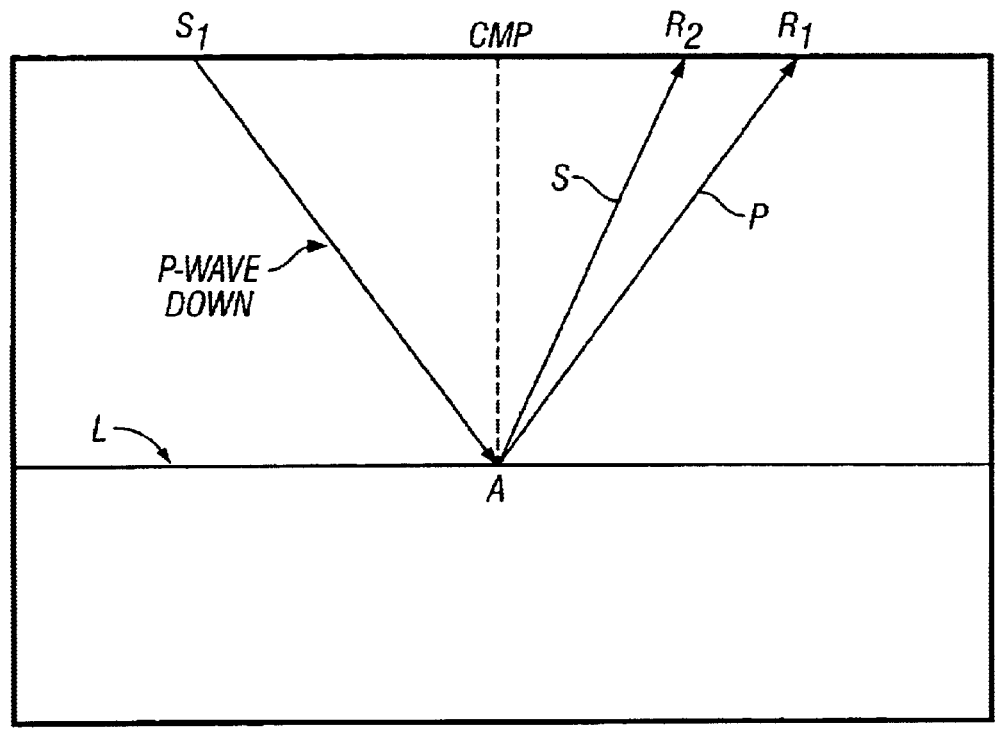
FIG. 3 illustrates a CMP with an S-wave and P-wave.
Figure 4:
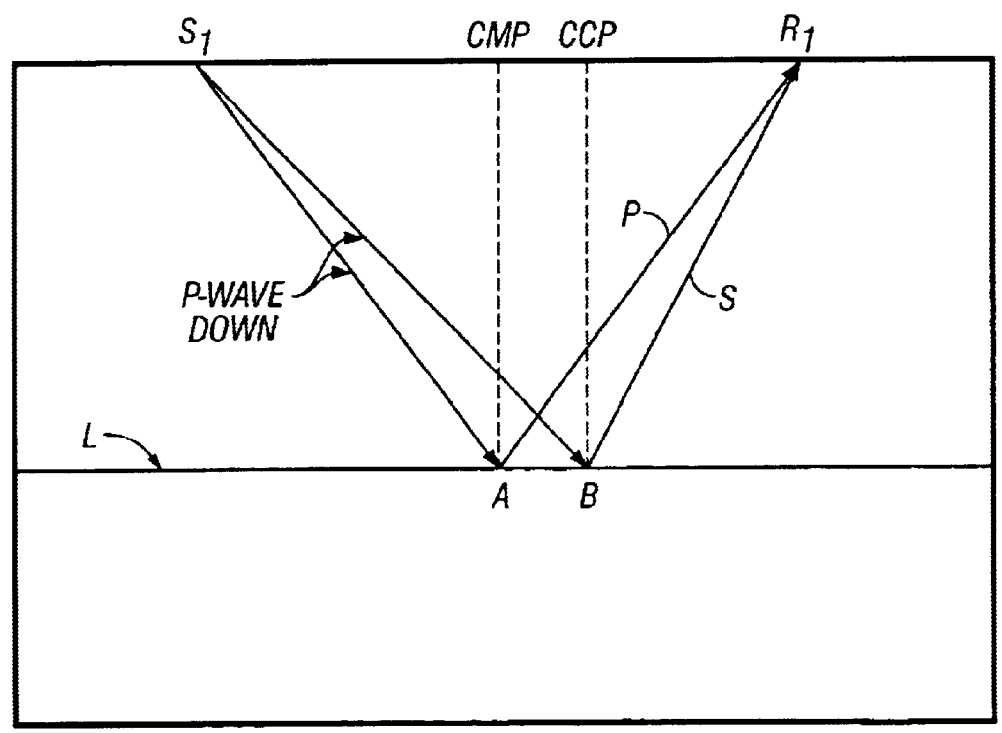
FIG. 4 illustrates a CMP relative to a CCP with an S-wave and P-wave.

FIG. 4 illustrates the relationship between a CMP and a CCP for a particular source to receiver pair. The CMP position for the P-wave energy traveling from as source at position $S_1$ to a receiver at position $R_1$ is the same midpoint A as illustrated in FIG. 3. FIG. 4 illustrates that downgoing P-wave energy that is converted to S-wave energy will follow a different P-wave down path and reflect from a different point B (the CCP) along layer L, and then be received at the same receiver position $R_1$ the P-wave energy traveling from the separate CMP reflected from along layer L. In contrast, point A in FIG. 3 is the CMP for P-wave energy down from source $S_1$ and P-wave energy reflected back to receiver $R_1$ and point A is also the CCP for P-wave energy down from $S_1$ and S-wave energy reflected back to receiver $R_2$.

Figure 2:
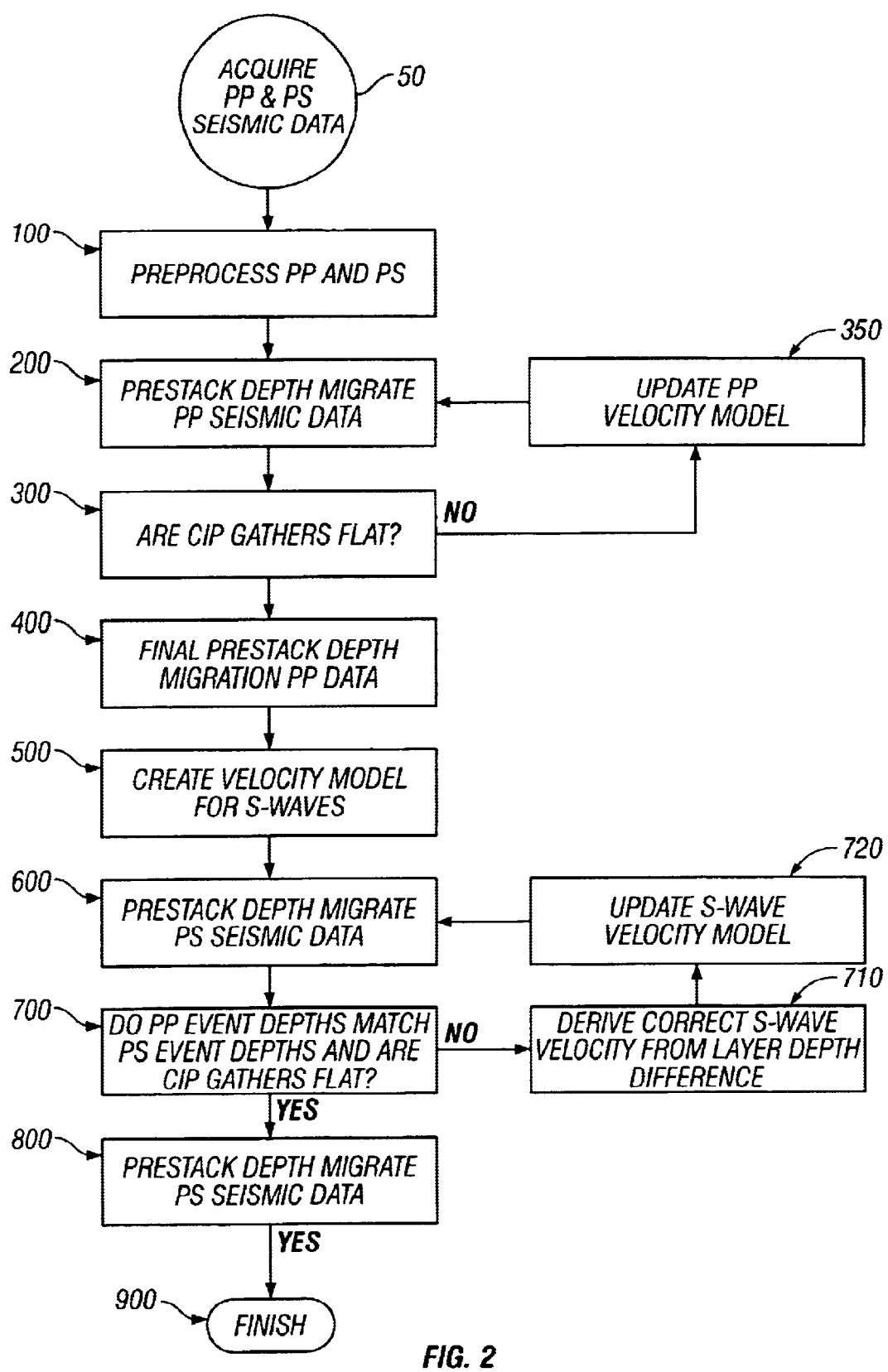
FIG. 2 is a detailed flow chart illustrating the method of the present invention.

Referring now to the flow chart of FIG. 2, the preferred method of updating and computing an S-wave velocity profile for depth migrating PS seismic data is illustrated. The method begins at step 50 with the acquisition of seismic data in the field using any one of numerous well-known seismic exploration techniques. In step 100 the resulting seismograms are then processed in well-known ways. The following techniques exemplify such processing. In the case of an ocean bottom cable the hydrophone seismogram is added to the z-component seismogram giving a PP seismogram (a P-wave transmitted to P-wave returned and recorded). In the case of an ocean bottom cable the multi-component geophones are often not oriented optimally in the cable. Therefore, an additional step of rotating the seismograms by a mathematical expression can be performed yielding a PS seismogram (P-wave transmitted to S-wave returned and recorded). Both the PP data and the PS data may have the source signature removed (e.g., deconvolved), then the data may be filtered, resampled or otherwise processed by known methods. In the case of the PP data, the data is sorted to common midpoint gathers. In the case of the PS data the data is sorted to CCP gathers. These gathers might be subjected to multichannel filters to remove noise and multiples resulting in PP and PS further processed seismograms.

Proceeding to step 200 the PP processed seismograms are prestack depth migrated yielding a depth migration dataset. Prestack depth migration uses a velocity model of the subsurface to reposition the seismograms that are recorded into time to proper locations in depth. The initial velocity model can be based upon analysis of well logs or stacking velocities or determined in conjunction with other known methods. The final velocity model may be derived as the depth migration process proceeds. After the data are depth migrated, the depth data can then be interpreted to locate hydrocarbons or similar valuable minerals.

There are several ways to depth migrate the data including Kirchhoff summation, finite difference methods, or frequency finite difference methods. Depth migration algorithms rely on accurate velocity models. For convenience of explanation, the present method employs Kirchhoff summation. Given a velocity model, a traveltime is calculated from a source position to a position in the subsurface known as a common image point, for example, from point $S_1$ to point A in FIG. 4. Another traveltime is calculated from the CIP to the receiver, for example, from point A to receiver $R_1$ for a PP common image point gather or from point A to receiver $R_2$ of FIG. 3 for a PS common image point gather. The amplitude from the seismogram corresponding to this source receiver position at the resulting time is summed into this common image point. Usually a similar offset is summed into one depth dataset. Offset is the distance from the source to receiver position. The dataset is then sorted by position on the earth and offset resulting in a common image point gather (CIP gather).

Figure 5:
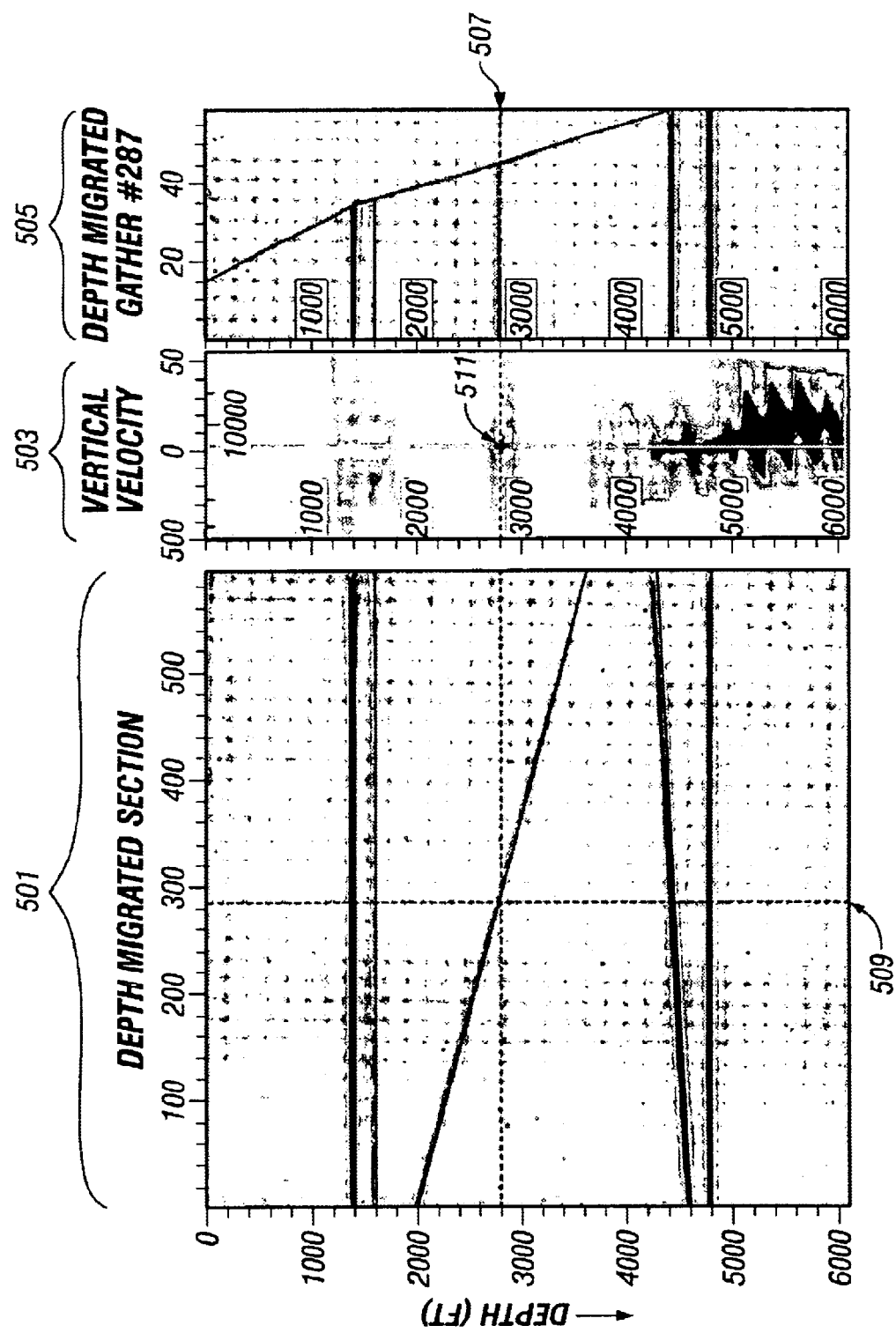
FIG. 5 illustrates a P-P depth section, CIP gather, and semblance analysis using correct P-wave velocity.

Proceeding to step 300, a CIP gather is analyzed according to known methods. FIG. 5 illustrates a synthetic PP depth section 501, a CIP gather 505 from the depth section 501 extracted from the position marked by 509 of the PP depth section, and semblance analysis panel 503 for the CIP gather 505 using a correct P-wave velocity. The dotted line 507 in FIG. 5 marks a common depth reference level of 2800 feet across the panels 501, 503 and 505. A semblance analysis, panel 503 in FIG. 5, may be run to analyze the curvature of the events in the CIP gather. If the velocity model is correct, the events in the CIP gather 505 corresponding to reflections in the subsurface at position 509 are flat. An example semblance maximum is illustrated in semblance panel 503 at 511 for an event at a depth of approximately 2800 feet. If the events are flat, or it is otherwise determined the velocity is acceptable, the method proceeds to step 400. If the events in the CIP gather are not flat or need further processing, the method proceeds to step 350.

At step 350 the P-wave velocity model is updated. The CIP gathers are analyzed in known ways to determine what velocity to use for data migration so that the events in the gather will be flat. There are several ways of determining the updated velocity. One method is to measure the depth error on the far offset location and calculate the velocity required to flatten the event by adjusting the velocity directly above the event in the CIP gather. Another method is to measure these depth errors but use a ray tracing inversion scheme known as tomography to determine the velocity model. Whatever method is used the PP velocity model is updated. The algorithm then proceeds back to step 200 where the PP seismograms are prestack depth migrated with the updated P-wave velocity model and then to step 300 where the CIP gathers are analyzed for flatness. After any required iterations the CIP gathers should be sufficiently flat, and thus the velocity model accurately represents the subsurface of the earth. This model may be used in step 400 to generate a final depth migrated PP seismic section, 501 in FIG. 5.

After deriving a final P-wave velocity model, the method proceeds to step 500 to create a preliminary S-wave velocity model. This can be accomplished by one of at least two ways. One, the $V_p/V_s$ ratio can be assumed to be constant throughout the model. Then a reasonable value of $V_p/V_s$ ratio for the area of interest can be used to determine the S-wave velocity model. In a second method, the $V_p/V_s$ ratio for each layer in the model can be made to vary, based on either the geological information or P-wave and S-wave log data from a well bore. This method may lead to a different velocity model than in the first case.

Figure 6A:
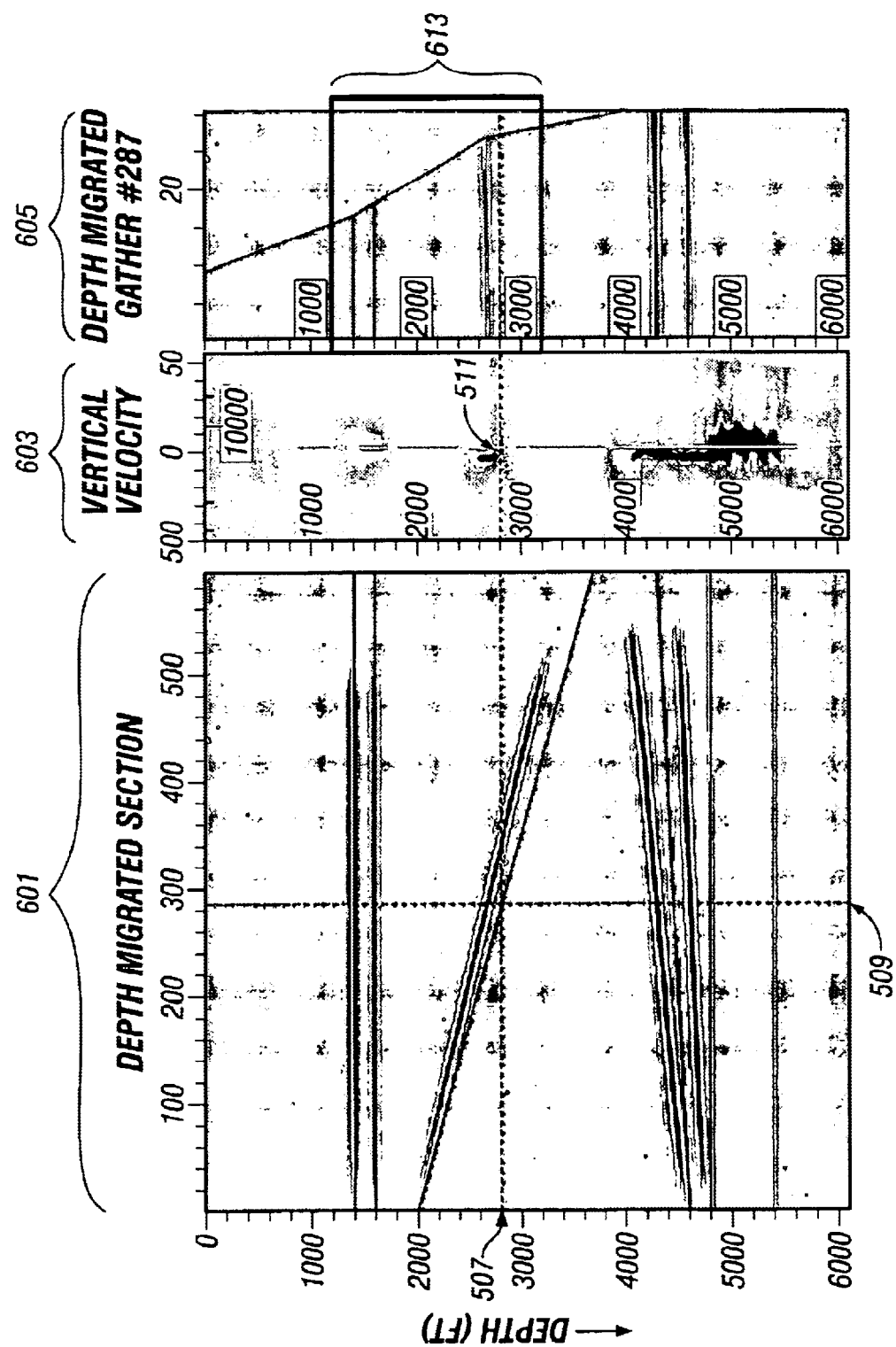
FIG. 6A illustrates a P-S depth section, CIP gather, and semblance analysis using incorrect S-wave velocity.

In step 600, the PS data is depth migrated using the P-wave and S-wave velocity models generated in steps 350 and 500 respectively to create CIP gathers. The PS depth migrated CIP gathers are used to determine whether the S-wave velocities need to be adjusted. FIG. 6A illustrates a PS depth section 601, CIP gather 605, and semblance analysis panel 603 using an incorrect S-wave velocity. The reference depth line 507 is located at approximately 2800 feet across panels 601, 603 and 605. The CIP panel is extracted from the position marked by 509 of the PP depth section, and semblance analysis panel 603 for the CIP gather 505 using an incorrect S-wave velocity.

At step 700 of FIG. 2 the CIP gathers are analyzed in comparison with the P-wave velocity model. If the depth of a reflector in the CIP PS gathers, 605 in FIG. 6A, at or near zero offset do not match the depth of the corresponding reflector in the P-wave velocity model then the S-wave velocity of the reflector is incorrect. Measures for velocity determination, for example semblance based summations over offsets as shown in 603 in FIG. 6A, may appear incorrect. Consequently, the S-wave velocity value for that reflector needs to be adjusted. Moreover, the depths of the reflectors in the stacked PS data do not match the correct depths and a reflector, which is known to be flat, may appear to be dipping.

Figure 6B:
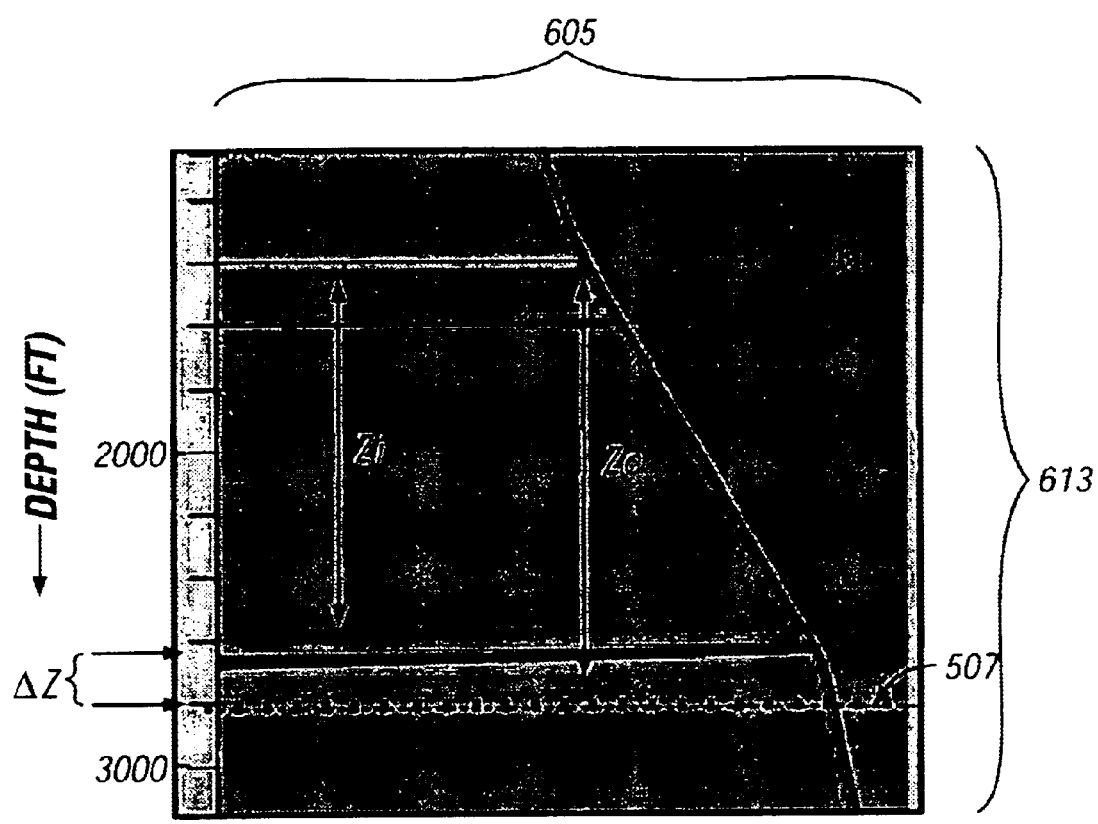
FIG. 6B illustrates a detail section of the CIP gather of FIG. 6A.

The outline box 613 in CIP panel 605 further illustrates in FIG. 6B the difference between correct and incorrect layer thicknesses. The correct depth of the event is known from the PP depth section 501, and is approximately 2800 feet. The layer thickness difference $\Delta Z$ for an incorrect PS depth migration is illustrated in FIG. 6B. The difference $\Delta Z$ is the difference between $Z_i$, the thickness of the layer after migration of PS data, and $Z_c$, the thickness of the layer in P-wave velocity model (assumed to be correct thickness).

In step 710, we proceed to calculate the correct S-wave velocity ($V_{sc}$) of a layer. This method is based on solving for $V_{sc}$ using the following equation, $$\frac{Z_i}{V_p} + \frac{Z_i}{V_{si}} = \frac{Z_c}{V_p} + \frac{Z_c}{V_{sc}} \quad (1)$$

Where,
$Z_c$=thickness of the layer in P-wave velocity model (assumed to be correct thickness)
$Z_i$=thickness of the layer after migration of PS data
$V_p$=P-wave velocity of the layer
$V_{si}$=S-wave velocity of the layer used to migrate PS data
$V_{sc}$=correct S-wave velocity of the layer
If we define the depth error $\Delta Z$ as $$\Delta Z = Z_c - Z_i$$

and measure this from the near-zero offset amplitude in the CIP gather and the corresponding layer in the P-wave data, then, $$V_{sc} = \frac{Z_c}{Z_i/V_{si} - \Delta Z/V_p}. \quad (2)$$

As an example, the originally derived parameter values for a sequence of velocity and depth determinations may be $Z_c$=1260 ft, $Z_i$=1115 ft, $V_p$=8000 ft/sec and $V_{si}$=2600 ft/sec. If, from analysis, it can be determined the shear velocity ($V_{si}$) for a particular (dipping) layer is incorrect because the CIP gather is not flat, and the error $\Delta Z$ in the depth of the layer is 145 ft we may determine appropriate values. Substituting the appropriate values in Equation (2) gives the correct shear wave velocity of 3068 ft/sec for the layer. A shear wave velocity of 3000 ft/sec was used for this layer in the seismic model.

Figure 7:
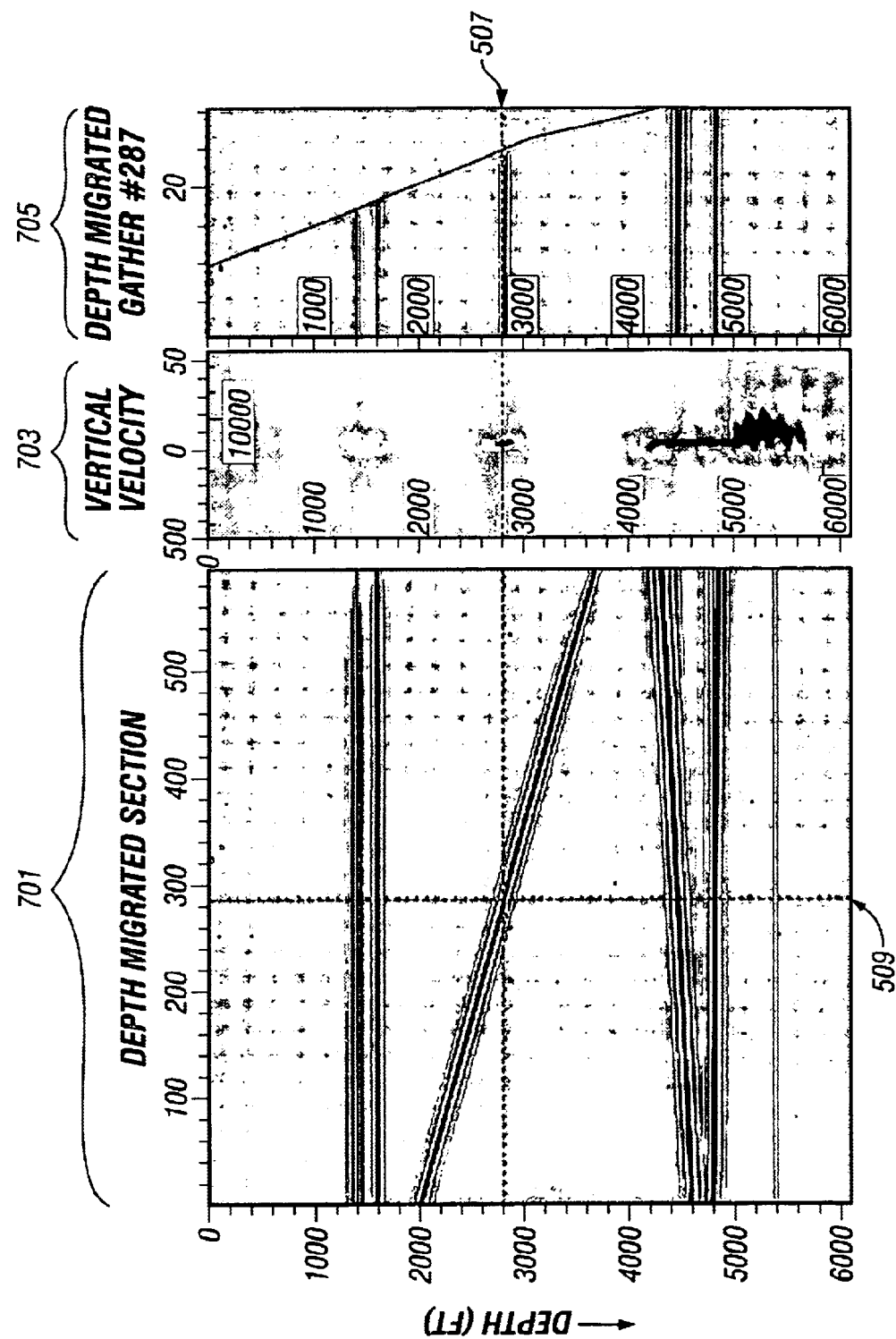
FIG. 7 illustrates a P-S depth section, CIP gather, and semblance analysis using updated S-wave velocity calculated using this method.

At step 720, the new appropriate velocity is used to update the S-wave velocity model. The PS data is migrated again at step 600 and CIPs analyzed at step 700. FIG. 7 illustrates a PS depth section 701, CIP gather 705, and semblance analysis panel 703 using an updated S-wave velocity calculated using the method of the present invention. After the CIP gather is flat, 705 in FIG. 7, the depth of the layers will match fairly well with the depth from the P-wave velocity model, dotted line 507 in CIP gather panel 705 of FIG. 7. For the example used here, the present method has predicted the shear velocity within 2.3 percent of the actual shear velocity. In many cases, the accuracy of the velocities may be improved using more iterations of the procedure and leads to improved results.

When P-wave and S-wave velocity models from steps 300 and 700 respectively are correct (or sufficiently accurate), these to depth results may be used to migrate the PS data in step 800. The product of this migration is the final prestack depth migrated PS seismic section (or volume), 701 in FIG. 7, in step 900.

Persons skilled in the art will understand that the method and apparatus described herein may be practiced, including but not limited to, the embodiments described. Further, it should be understood that the invention is not to be unduly limited to the foregoing which has been set forth for illustrative purposes. Various modifications and alternatives will be apparent to those skilled in the art without departing from the true scope of the invention, as defined in the following claims. While herein has been illustrated and described particular embodiments of the present invention, it will be appreciated that numerous changes and modifications will occur to those skilled in the art, and it is intended in the appended claims to cover those changes and modifications which fall within the true spirit and scope of the present invention.

What is claimed is:

1. A method of processing seismic data, the method comprising:
   a) acquiring seismic data comprising P-wave, S-wave and mode-converted seismic data;
   b) determining a P-wave velocity model for the seismic data;
   c) determining an S-wave velocity model from said P-wave velocity model;
   d) depth migrating said mode converted seismic data thereby forming CIP mode converted seismic data gathers; and
   e) determining corrected S-wave velocities from near-offset data of said CIP gathers which correct said depth migrated mode converted seismic data to said P-wave velocity model depth.

2. The method of claim 1 wherein determining said corrected S-wave velocities further comprises determining a correction factor using $$V_{sc} = \frac{Z_c}{Z_i/V_{si} - \Delta Z/V_p}.$$

3. The method of claim 1 further comprising repeating step d) and step e) to determine corrected S-wave velocities.

4. The method of claim 1 further comprising updating said S-wave velocity model for depth migration using said corrected S-wave velocities.

5. The method of claim 1 further comprising migrating said seismic data using said corrected S-wave velocities.

6. The method of claim 1 further comprising prestack depth migrating mode-converted seismic data using said corrected S-wave velocity model.

7. The method of claim 1 further comprising calculating traveltime tables for downgoing P-waves.

8. The method of claim 1 further comprising calculating traveltime tables for upgoing S-waves.

9. The method of claim 1 further comprising prestack depth migrating said mode converted seismic data to form a final depth-migrated mode-converted seismic data volume.

10. A method for determining a shear wave velocity model for seismic data processing, the method comprising:
    a) determining a P-wave velocity model and P-wave traveltime table, and depth migrating P-wave seismic data;
    b) determining an initial S-wave velocity model from said P-wave velocity model;
    c) depth migrating mode converted seismic data thereby forming CIP gathers;
    d) determining corrected S-wave velocities from near-offset data of said CIP gathers which correct said depth migrated mode converted seismic data to said P-wave velocity model depth; and
    e) determining a corrected S-wave velocity model.

11. The method of claim 10 wherein determining said corrected S-wave velocities further comprises determining a correction factor using $$V_{sc} = \frac{Z_c}{Z_i/V_{si} - \Delta Z/V_p}.$$

12. The method of claim 10 further comprising repeating step c) and step d) to determine an updated corrected S-wave velocity model.

13. The method of claim 10 further comprising migrating said seismic data using said corrected S-wave velocities.

14. The method of claim 10 further comprising-prestack depth migrating mode-converted seismic data using said corrected S-wave velocity model.

15. The method of claim 10 further comprising calculating traveltime tables for downgoing P-waves.

16. The method of claim 10 further comprising calculating traveltime tables for upgoing S-waves.

17. The method of claim 10 further comprising prestack depth migrating said mode converted seismic data to form a final depth-migrated mode-converted seismic data volume.

18. The method of claim 6 further comprising repeating step c) and step d) to determine updated corrected S-wave velocities.

19. The method of claim 6 further comprising determining an S-wave velocity model for depth migration using said updated corrected S-wave velocities.

20. A method for determining a shear wave velocity model for prestack depth migration of mode-converted seismic data, the method comprising:
    a) determining a P-wave velocity model and P-wave traveltime table, and depth migrating P-wave seismic data;
    b) determining an initial S-wave velocity model and S-wave travel time tables from said P-wave velocity model;
    c) depth migrating mode converted seismic data thereby forming CIP gathers;
    d) determining corrected S-wave velocities from near-offset data of said CIP gathers which correct said depth migrated mode converted seismic data to said P-wave velocity model depth; and
    e) determining a corrected S-wave velocity model.

21. The method of claim 18 wherein determining said corrected S-wave velocities further comprises determining a correction factor using $$V_{sc} = \frac{Z_c}{Z_i/V_{si} - \Delta Z/V_p}.$$

22. The method of claim 18 further comprising prestack depth migrating said mode converted seismic data to form a final depth-migrated mode-converted seismic data volume.

* * * * *

UNITED STATES PATENT AND TRADEMARK OFFICE
CERTIFICATE OF CORRECTION

PATENT NO.   : 6,820,010 B1
DATED        : November 16, 2004
INVENTOR(S)  : Surinder K. Sahai and Robert A. Meek It is certified that error appears in the above-identified patent and that said Letters Patent is hereby corrected as shown below:

Column 1,
Line 55, please delete "lime" and insert -- time --

Column 3,
Line 63, please delete "pan" and insert -- part --

Signed and Sealed this

Fifteenth Day of February, 2005

JON W. DUDAS
*Director of the United States Patent and Trademark Office*